March 19, 1929.   J. SCHNEPF   1,705,686
RECUPERATIVE ANNEALING FURNACE
Filed Oct. 20, 1927
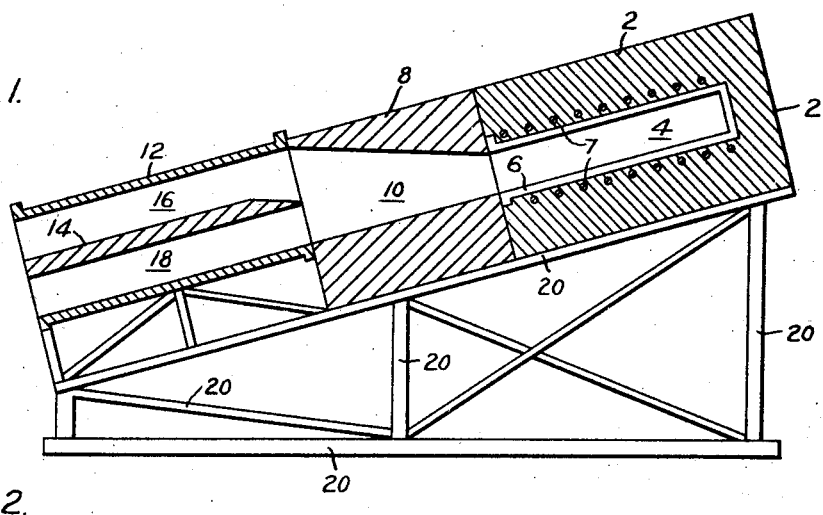
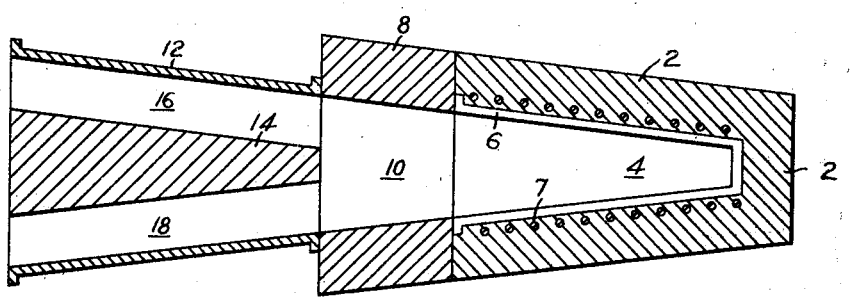
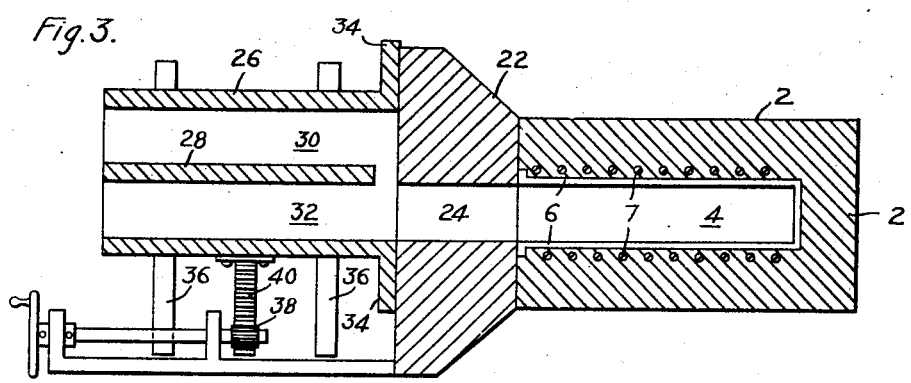
INVENTOR
Johann Schnepf.
BY
ATTORNEY Patented Mar. 19, 1929.

1,705,686

UNITED STATES PATENT OFFICE.

JOHANN SCHNEPF, OF NUREMBERG, GERMANY, ASSIGNOR TO WESTINGHOUSE ELECTRIC & MANUFACTURING COMPANY, A CORPORATION OF PENNSYLVANIA.

RECUPERATIVE ANNEALING FURNACE.

Application filed October 20, 1927, Serial No. 227,413, and in Germany August 14, 1926.

My invention relates to electric furnaces and more particularly to recuperative furnaces for heat treating or annealing.

In furnaces of the above mentioned type, it has been customary to provide two laterally adjacent rows of furnace chambers, the central chamber in each row effecting the desired heating of the material to be treated. The material is then passed through the rows of chambers in oppositely moving streams, so that the chamber into which the material is moved after heating is adjacent a chamber of the other row into which the cold or untreated material has been placed. Preheating of the untreated material is thereby effected.

Such arrangements are disadvantageous, however, because of the large area of floor space required for the installation.

An object of my invention, therefore, is to provide a recuperative heat treating furnace with the successive chambers thereof so arranged that the floor space required for the installation is reduced to a minimum.

In practicing my invention, I provide an open-end furnace chamber in which the main heating operation takes place and two laterally adjacent chambers communicating therewith and open at the outer ends thereof to permit the insertion and removal of material to be heat treated. One of the two laterally adjacent chambers receives the material from the heating chamber to permit a relatively slow cooling thereof, and heat therefrom preheats untreated material in the other chamber.

In the drawings:

Figure 1 is a view, in vertical longitudinal section, of a furnace embodying my invention;

Fig. 2 is a view, in vertical longitudinal section, of a slightly modified form of my invention; and, Fig. 3 is a view, in vertical longitudinal section, of another modification of my invention.

Referring more particularly to Fig. 1, a plurality of walls 2 of suitable refractory heat-insulating material define a furnace chamber 4 open at one end for the reception of the material to be heated. An electrical-resistance heating element 7, substantially helical in form, surrounds the chamber 4 to effect the heating thereof and is protected by an open-end sleeve 6 of a suitable heat-resistant material of high thermal conductivity.

Cooperating with the open end of the furnace chamber 4 is a mass of refractory material 8 having a passage 10 formed therethrough. The bottom wall of said passage is in the same plane as the floor or chamber 4, and the upper wall is sloped upwardly from the level of the roof of chamber 4 to form an enlarged charging opening for the heating chamber.

A shell 12, substantially coextensive in internal dimensions with the large end of passage 10, is secured to the refractory portion 8 in any desired manner, and is provided with a longitudinally extending partition 14 forming two adjacent chambers 16 and 18. The shell 12 and partition 14 are of a refractory material of relatively high thermal conductivity, for a purpose hereinafter described.

The longitudinal axes of chambers 4, 16 and 18 are substantially parallel and disposed at an angle to the horizontal. The structure is maintained in operating position by a suitable framework 20 secured thereto.

With the structure described, a continuous passage is formed through the chamber 16 into the heating chamber 4 and back from the chamber 18.

In Fig. 2, the construction is substantially the same as above described except that the longitudinal axes of the chambers 16 and 18 are angularly disposed with respect to each other and, cooperate with the furnace chamber 4, provide a continuous passage of V-shape.

In Fig. 3, a wall 2 and chamber 4 are the same as the corresponding elements in Fig. 1. Secured to the open end of the heating chamber structure is a refractory mass 22 having an aperture 24 extending therethrough in alinement with the chamber 4 and substantially coextensive, in internal dimensions, therewith.

A shell 26, corresponding to the shell 12 of Fig. 1, is provided with a partition 28 of relatively low thermal conductivity defining chambers 30 and 32, and is flanged as at 34 to bear against the face of the refractory portion 22. The structure, containing the chambers 30 and 32, is mounted for movement laterally of the axis of chamber 4 upon guide rails 36 so that chambers 30 and 32 may be successively brought into alinement with the passage 24.

A hand-driven gear 38 cooperating with a rack 40, secured to wall 26, effects the movement thereof.

In operation, referring more particularly to Fig. 1, material to be heat treated is placed in chamber 16 and moved successively into chamber 4, for the heating operation, and, upon the completion thereof, into chamber 18 for relatively slow cooling. The material in the present instance (not shown), is wire which is bundled to a size to permit the insertion thereof into the successive chambers. As each bundle in chamber 18 becomes sufficiently cooled, it is withdrawn and the bundle in chamber 4 which has been heated is moved thereinto. A bundle from chamber 16 is then moved into chamber 4 and a cold untreated bundle is placed in chamber 16.

With the arrangement of parts and the procedure described, each bundle placed in chamber 16 is preheated by the heat given off by a bundle in chamber 18, as it is cooling. A considerable saving is thereby effected, both in the energy required to heat the material in chamber 4 to the desired temperature, and in the length of time required to bring the bundle up to the desired heat.

The operation of the furnace shown in Fig. 2 is identical with that shown in Fig. 1, the main difference being that the paths of movement of the bundles into and out of the heating chamber are substantially in a straight line and the handling of the bundles is thereby facilitated.

In the operation of the structure shown in Fig. 3, the same general idea of utilizing the heat given off by the material while cooling, to preheat the untreated material, is utilized. In this modification, the cold or untreated material is placed in chamber 30 and the heated material is in chamber 32 for cooling. When the sufficiently cooled bundle of material is removed from chamber 32, the hot bundle from chamber 4 is moved thereinto, and, by means of the hand wheel and gearing 38 and 40, the chamber structure is dropped to bring chamber 30 into alinement with chamber 24. The material in chamber 30, which has been preheated by heat from the bundle cooling in chamber 32, is then moved into the chamber 34 to be heated. A cold bundle is then placed in chamber 30 to be preheated.

By my invention, I have provided a recuperative heat-treating furnace which is efficient in operation and which reduces to a minimum the floor space required for the installation thereof.

While I have shown and described a particular furnace design and have specified the materials used in the construction thereof, it is obvious that departure may be made therefrom and still be within the scope of my invention. For example, in Fig. 3 the manual means for controlling the movement of the chamber structure 26 is purely schematic and may be accomplished in any well known manner, and, so far as the operation of the several modifications is concerned, the particular source of heat employed is immaterial.

Modifications may be made in my invention without departing from the spirit and scope thereof, and I desire, therefore, that only such limitations shall be placed thereon as are imposed by the prior art and by the appended claims.

I claim as my invention:

1. In a recuperative heat treating furnace, the combination with a heating chamber provided with an opening at one end thereof, of a member mounted for movement laterally of said heating chamber opening, and provided with a passage therethrough, a partition of low thermal conductivity longitudinally dividing said passage into two chambers, and means for moving said member to bring said chambers successively into alinement with said heating chamber opening, to facilitate the charging and discharging of said heating chamber, whereby material in one of said chambers which has been heated in said heating chamber effects the preheating of cold material in the other chamber.

2. In an annealing furnace, the combination with a heating chamber provided with an opening at one end thereof for the reception of material to be heated, of a movable member provided with two laterally adjacent passages therethrough forming preheating and cooling chambers, and means for moving said chambers successively into communication with said heating chamber, whereby heated material may be moved into said cooling chamber to effect the preheating of material in said preheating chamber and material in said preheating chamber may be moved into said heating chamber.

In testimony whereof, I have hereunto subscribed my name this 4th day of August, 1927.

JOHANN SCHNEPF.